SHAPER FOR PRODUCING UNIFORM RECTANGULAR PULSES FROM VARIOUSLY SHAPED SIGNALS

Filed May 26, 1965

INVENTOR.
LAWRENCE GARDE
BY
Arnold E. Renner
ATTORNEY

United States Patent Office 3,368,153
Patented Feb. 6, 1968

3,368,153
SHAPER FOR PRODUCING UNIFORM RECTANGULAR PULSES FROM VARIOUSLY SHAPED SIGNALS

Lawrence Garde, Minneapolis, Minn., assignor to General Electric Company, a corporation of New York Filed May 26, 1965, Ser. No. 459,033
10 Claims. (Cl. 328—164)

ABSTRACT OF THE DISCLOSURE

A pulse shaper employs a circuit which transforms signals of varying amplitudes into constant amplitude signals. These constant-amplitude signals are coupled to a trigger circuit which produces uniform rectangular pulses.

Figure 1:
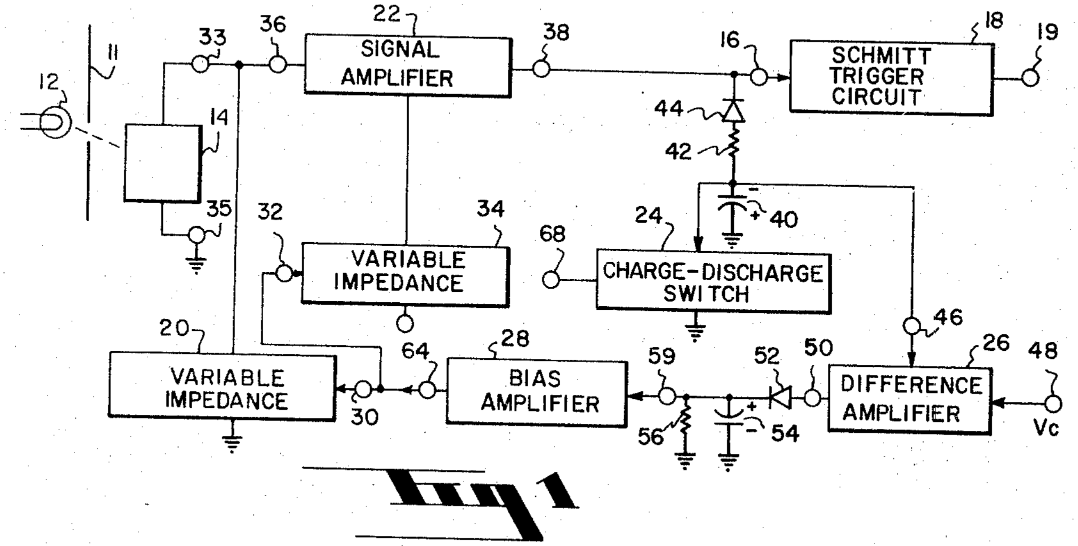

This invention relates generally to pulse shapers and more particularly to shapers which are especially suited to reshape electrical signals by transforming variously shaped pulses into rectangular pulses whose time durations are essentially constant.

In electronic data processing systems, information bearing media such as punched cards and punched tapes are widely used for storing information. Equipment known as card readers and paper tape readers are used for photoelectrically generating electric signals which correspond to information stored on cards or tapes passing between a light source and a reading head. These reading heads may employ suitable light responsive elements such as photoelectric cells or phototransistors to detect the presence or absence of holes at particular locations of the information bearing medium. For example, in punched cards the holes are separated by narrow "webs" of material. The reading head develops an electrical signal which is intended to be a representation of the pattern of holes and web of the punched card being read.

As a hole in the information bearing medium moves between the light source and the reading head, light falls upon a light sensitive surface of the reading head which produces a current that is proportional to the amount of light falling on the light sensitive surface. The intensity of the light varies gradually from a low value to a high value and back to a low value. This occurs because, as the hole in the information bearing medium first starts to move between the light source and the reading head, light falls on only part of the light sensitive surface of the reading head. As the hole in the card moves directly between the light source and reading head, light falls on the entire light sensitive surface of the reading head. Further movement of the hole produces a reduced amount of light falling on the reading head. The resulting output of the reading head, accordingly, also varies gradually from a low current to a high current and back to a low current. Thus, it is noted that the waveform generated does not instantly change from one given level to another given level in response to the pattern of holes and web on the information bearing medium but gradually changes from one level to another level. This gradually changing current condition lacks the reliability needed in computer operation where a rapid rise and a rapid fall in current or voltage is required.

A further deterioration of the waveform generated is caused by the aging characteristics of the light source, light responsive element and associated electrical circuit components which reduce the output current values of the reading head. Dust which collects on the light source and on the light responsive element also reduces the output current from the reading head.

Shaper circuits of the prior art have been developed which convert the gradually changing waveform into rectangular pulses. However, these prior art circuits are sensitive to variations in amplitude of an applied waveform and develop rectangular pulses whose time duration is dependent upon the current amplitude of the applied waveform. Thus, these prior art circuits fail to produce a waveform which accurately represents the pattern of holes and web of the information bearing medium being read.

Accordingly, a shaper is needed which will produce rectangular pulses having a uniform time duration even when an applied waveform varies in amplitude.

It is, therefore, an object of this invention to provide an improved pulse shaper circuit whose output signal is an accurate representation of the pattern of holes and web of an information bearing medium being read.

Another object is to provide an improved pulse shaper circuit whose output signal is substantially unaffected by variations in amplitude of the input signal.

A further object of this invention is to provide an improved pulse shaper circuit which compensates for aging characteristics of components in the card or paper tape reader and develops an output signal which is an accurate representaion of the patern of holes and web of an information bearing medium being read.

The foregoing objects are achieved, in the instant invention, by providing a pulse shaper having a Schmitt trigger circuit and a means for supplying an essentially constant amplitude signal to the Schmitt trigger circuit. This constant amplitude signal causes the Schmitt trigger circuit to develop a series of output pulses which are an accurate representation of the pattern of hole and web of the information bearing medium being read. The means for supplying the constant amplitude signal includes a variable impedance, a signal amplifier having a variable gain and a source of bias voltage.The variable impedance is coupled to reading head and develops a signal voltage which is proportional to the value of impedance. The signal voltage is applied to the amplifier and causes the amplifier to produce an output voltage which is proportional to the voltage gain of the amplifier. The output voltage from the amplifier is applied to an energy storage circuit which develops a bias voltage that causes the value of the variable impedance to be inversely proportional to the signal current over a predetermined range of current values. The bias voltage causes the gain of the signal amplifier to be inversely proportional to the signal current from the reading head over a predetermined range of current values. This novel manner in which the input signal current is amplified and used to control the value of a variable impedance and the gain of an amplifier causes the duration of the pulses produced to be substantially constant for a wide range of input signal current values.

Figures 2, 3, 4:
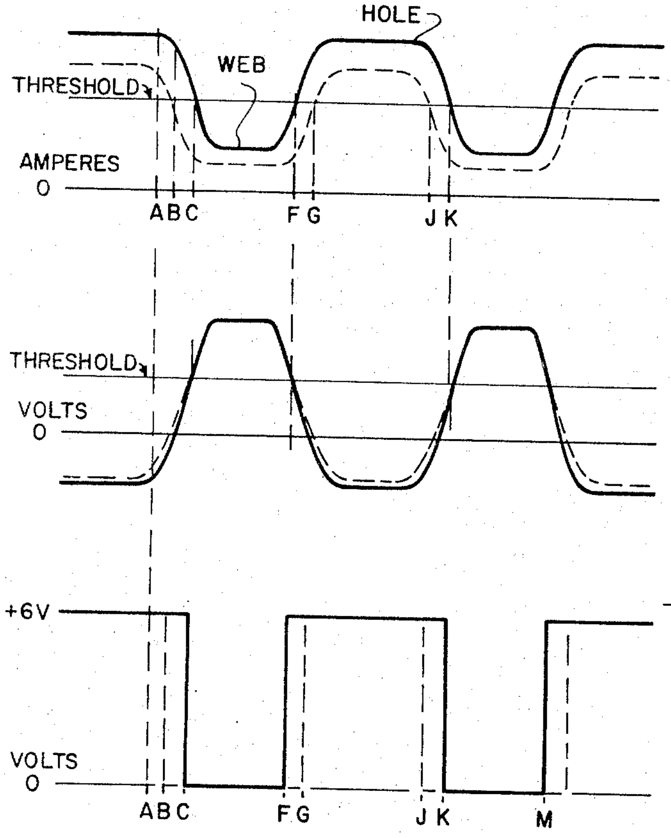

Other objects and advantages of the present invention will become apparent from the following description when taken in connection with the accompanying drawings, wherein:

FIG. 1 is a block diagram of a pulse shaper embodying the present invention; and FIGS. 2, 3 and 4 illustrate waveforms useful in explaining the operation of the present invention.

Before beginning the detailed explanation of the present invention, a brief description of the problems prevalent with the prior art pulse shapers is believed warranted. Many prior art pulse shapers apply the signal, represented by the solid line waveform of FIG. 2, to the input terminal of a trigger circuit such as a Schmitt trigger circuit. The Schmitt trigger circuit is a circuit operable in either of two states and includes a signal input terminal and a signal output terminal. The operating state of the Schmitt trigger circuit depends upon the amplitude of the trigger signal applied to the signal input terminal. That is, the Schmitt trigger circuit operates in a first state as long as a trigger signal greater than a threshold value is applied to the signal input terminal. When no trigger signal is applied or when a trigger signal less than a threshold value is applied to the signal input terminal, the Schmitt trigger circuit operates in a second state. When the Schmitt trigger circuit operates in the first state an output terminal has a first voltage level. When the Schmitt trigger circuit operates in a second state the voltage at the output terminal is at a second level.

When the signal represented by the solid line shown in FIG. 2 is applied to a Schmitt trigger circuit, the trigger circuit changes from a first state to a second state as the input signal becomes less than the threshold value which is shown at time C. The trigger circuit returns to the first state as the input signal becomes greater than the threshold value which is shown at time F in FIG. 2. The voltage at the output terminal of the trigger circuit changes from a first level, such as +6 volts to a second level, such as 0 volts, at time C and returns to the first level at time F. A solid line waveform representing this voltage is shown in FIG. 4.

When the current developed by the reading head is reduced due to aging of components or due to dust on the light source and reading head, a signal of reduced amplitude such as that represented by dashed lines in FIG. 2 is applied to the trigger circuit. The trigger circuit now changes from the first state to the second state at time B, the point at which the input signal becomes less than the threshold value. At time G the trigger circuit returns to the first state as the input signal becomes greater than the threshold value. The voltage at the output terminal of the trigger circuit changes from a first level, such as +6 volts to a second level such as 0 volts, at time B and returns to the first level at time G. The waveform representing this voltage is shown by the dashed lines in FIG. 4. Thus, the prior art pulse shaper produces pulses having a time duration which is dependant upon the level of the signal developed by the reading head. As the level of the reading head signal decreases, the duration of the pulse produced by a web of the information bearing medium increases.

To prevent this variation in the duration of the output pulse, the present invention employs means for providing a constant amplitude signal at an input terminal of a trigger circuit, such as a Schmitt trigger circuit. This present invention, as shown in FIG. 1, utilizes an information bearing medium 11, which passes between a light source 12 and a reading head 14. Reading head 14 produces a signal current which is directly proportional to the amount of light falling on the reading head. As the information bearing medium moves, the head develops a signal in response to the pattern of holes and web of the medium. The solid line waveform of FIG. 2 represents this signal with a web passing between light source 12 and reading head 14 approximately between time C and time F, and a hole in the information bearing medium passing between the light source and the reading head approximately between time F and time K. As stated above, the dashed line waveform of FIG. 2 represents a signal from reading head 14 wherein the current is reduced due to aging of components or due to dust. The present invention includes a means for converting the signals shown in FIG. 2 into a constant amplitude signal which is applied to an input terminal 16 of a Schmitt trigger circuit 18. The trigger circuit delivers pulses having a constant time duration to an output terminal 19.

The means for converting the signals into a constant amplitude signal includes a variable impedance 20, a controllable variable-gain signal amplifier 22 and a feedback circuit which controls the value of impedance 20 and the gain of amplifier 22. The feedback circuit includes a difference amplifier 26 and a bias amplifier 28. The feedback circuit produces a bias voltage which is determined by the current developed by reading head 14 when there is full illumination falling on the reading head, a time prior to the time information bearing media pass between reading head 14 and the light source 12. This bias voltage is applied to a control terminal 30 of variable impedance 20 and to a control terminal 32 of a variable impedance 34. Impedance 34 is the load for amplifier 22. As the voltage gain of an amplifier is directly proportional to the value of the impedance of the load, the gain of amplifier 22 can be controlled by controlling the value of impedance 34.

The variable impedances used in the present invention can be any of several types in which a voltage applied to a control terminal controls the value of the impedance. For example, a voltage applied to the base of a transistor controls the impedance between the emitter and the collector of the transistor.

The constant amplitude input signal for Schmitt trigger circuit 18 is developed in the following manner. As stated above, reading head 14 produces a current which is directly proportional to the amount of light falling on the reading head. This current from reading head 14 is supplied to a pair of signal terminals 33 and 35. Current flows from terminal 33 through impedance 20 to terminal 35 producing a voltage across impedance 20 which is equal to the product of the current and the value of the impedance through which this current flows. The voltage across impedance 20 is applied to an input terminal 36 of signal amplifier 22. Amplifier 22 is a direct-coupled amplifier which amplifies and inverts the signal applied to input terminal 36 and delivers a signal to an output terminal 38 illustrated by the solid line waveform shown in FIG. 3. The value of this output signal is dependant upon the value of variable impedance 20 and by the gain of amplifier 22. The value of each of the impedances 20 and 34 varies inversely as the value of a negative bias voltage applied respectively to a pair of signal terminals 30 and 32. For example, as the voltage applied to terminal 30 becomes more negative the value of impedance 20 decreases.

From the above explanation, it is seen that the value of the bias voltage used to control the values of impedances 20 and 34 is determined by the amount of light falling on the reading head prior to time A (FIG. 2), when no information bearing medium is passing between the light source and the reading head 14. This prevents information on the information bearing medium from affecting the value of the bias voltage. The voltage at terminal 38 (FIG. 3) is applied to a filter circuit comprising a capacitor 40, a resistor 42 and a diode 44. Capacitor 40 acts as an energy storage means and resistor 42 limits current flow to prevent short duration pulses from causing an appreciable change in voltage across capacitor 40. Diode 44 prevents positive voltages, which appear at terminal 38 of amplifier 22 from affecting the voltage on capacitor 20. Prior to time A (FIG. 3) a negative voltage is present at terminal 38. This negative voltage, applied to diode 44, causes a charging current to flow from ground to the lower plate of capacitor 40, from the upper plate of capacitor 40 through resistor 42, and through diode 44 to terminal 38 thereby charging capacitor 40 to the polarity shown in FIG. 1.

The negative voltage thus developed on the upper plate of capacitor 40 is applied to an input terminal 46 of a difference amplifier 26. (A difference amplifier is an amplifier having first and second signal input terminals and an output terminal. The voltage received at the first input terminal is compared with a voltage received at the second input terminal and the amplifier produces a voltage at the output terminal which is determined by the difference between the voltages at the first and second input terminals.) In the amplifier 26 any difference between the negative voltage applied to terminal 46 and a reference voltage Vc applied to terminal 48 causes a positive voltage to be developed at an output terminal 50 of amplifier 26. As the voltage at terminal 46 becomes more negative, the voltage at terminal 50 becomes less positive. The positive voltage at terminal 50 causes capacitor 54 to charge to the polarity shown in FIG. 1. A resistor 56, connected in parallel across capacitor 54, allows the voltage across capacitor 54 to decrease if the value of positive voltage at terminal 50 decreases. The positive voltage across capacitor 54 is applied to an input terminal 59 of a direct-coupled bias amplifier 28. This positive voltage is inverted and amplified by amplifier 28 resulting in a negative bias voltage at output terminal 64 of the amplifier 28. This bias voltage from output terminal 64 is applied to terminals 30 and 32 of variable impedances 20 and 34 and determines the value of these impedances with a smaller value of negative bias voltage causing a larger value of impedance in both impedances 20 and 34 as previously stated.

If the amplitude of the current produced by the reading head 14 decreases from the solid line waveform to the aveform as shown by the dashed lines of FIG. 2, the voltage applied to terminal 36 of amplifier 22 decreases. This in turn, causes a decrease at output terminal 38 which causes the voltage developed across capacitor 40 to become less negative and a decrease positive voltage to be developed across capacitor 54. The decreased positive voltage of capacitor 54 applied to terminal 59 of amplifier 28 causes a decreased negative voltage to be applied to variable impedances 20 and 22 which results in an increase in the value of these impedances. Increasing the value of impedance 20 increases the voltage developed across impedance 20 thereby increasing the voltage applied to terminal 36 of amplifier 22. In a similar manner the negative voltage applied to terminal 30 of impedance 34 increases the value of the impedance contained in impedance 34 thereby increasing the gain of amplifier 22. The increase in gain of amplifier 22 and the increased value of impedance 20 cause the signal at terminal 38 of amplifier 22 to be increased to substantially the same value as was applied at this terminal 38 before the current applied to terminals 33 and 35 was reduced. This signal is represented by the dashed line waveform in FIG. 3. The duration between the times the dashed line waveform crosses the threshold value in FIG. 3 is substantially equal to the duration between the times the solid line waveform crosses the threshold value. As a result the duration of the pulses produced at output terminal 19 of the Schmitt trigger circuit 18 is substantially constant.

Noise may occasionally produce an improper voltage across capacitor 40. Therefore a charge-discharge switch 24 is employed to facilitate the establishment of a proper voltage level across capacitor 40. An example of a suitable switch for this purpose may be found on page 73 of the Transistor Manual, sixth edition, 1962, published by the General Electric Company. When no signal is applied to a terminal 68 of charge-discharge switch 24, the switch is essentially an open circuit. When an appropriate signal is applied to terminal 68, switch 24 becomes a low resistance and quickly discharges capacitor 40 thus eliminating the spurious effects of noise. The switch again becomes an open circuit so that capacitor 40 can charge to a voltage determined by the signal prior to time A (FIG. 3).

An appropriate signal to control he discharge of capacitor 40 can be obtained from a separate source or from an appropriate terminal of the circuit shown in FIG. 1. For example, in one embodiment of the circuit, switch 24 is designed so that a positive voltage applied to terminal 68 causes switch 24 to become a low resistance while a negative voltage or no voltage at terminal 68 causes the switch to be essentially an open circuit. In this case, terminal 68 is connected to terminal 38 in order that the negative voltage present at terminal 38 prior to time A (FIG. 3) causes switch 24 to be an open circuit, thus insuring that the voltage across capacitor 40 is determined by the voltage at terminal 38 prior to time A. When a web of an information bearing medium passes between the light source 12 and reading head 14, the positive voltage at terminal 68 causes switch 24 to be a low resistance, the voltage across capacitor 40 decreases rapidly and prevents any voltage on terminal 46 of amplifier 26 from causing an increase in voltage across capacitor 54.

Thus, the object set forth herein are realized by the instant invention, wherein a novel arrangement of elements has provided a constant amplitude signal to the input terminal of a trigger circuit thereby causing the trigger circuit to provide output pulses having an essentially constant time duration.

While the principles of the invention have now been made clear in an illustrative embodiment, there will be immediately obvious to those skilled in the art many modifications of structure, arrangement, proportions, the elements, materials, and components, used in the practice of the invention, and otherwise, which are particularly adapted for specific environments and operating requirements without departing from those principles. The appended claims are therefore intended to cover and embrace any such modifications, within the limits only of the true spirit and scope of the invention.

What is claimed is:

1. A pulse shaper for use with a source of electrical signal current comprising: a variable impedance the value of which varies in accordance with an applied bias voltage, said impedance being adapted to receive a signal current from said source and to develop a signal voltage in response to said current; an energy storage means for developing said bias voltage in response to said signal voltage, said storage means being coupled to said impedance, said storage means being adapted to receive said signal voltage and to deliver a bias voltage determined by said signal voltage; means for controlling the value of said impedance in response to the value of said bias voltage, said means for controlling being coupled to said storage means and to said impedance; trigger circuit having two states of operation; an amplifier having an input terminal and an output terminal, said input terminal of said amplifier being connected to said impedance, said output terminal of said amplifier being connected to said trigger circuit, said amplifier amplifying said signal voltage from said impedance and delivering an amplified signal to said trigger circuit; and means for controlling the gain of said amplifier in response to said bias voltage, said means for controlling being coupled to said storage means and to said amplifier, said trigger circuit delivering rectangular pulses each having a predetermined time duration in response to the signal voltage.

2. A pulse shaper for use with a source of electrical signal current comprising: a variable impedance the value of which varies in accordance with an applied bias voltage, said impedance being adapted to receive current from said source and to develop a signal voltage in response to said current; a diode; a capacitive storage means, said diode being adapted to receive said signal voltage and to deliver a bias voltage to said storage means, said bias voltage being determined by said signal voltage, said storage means being coupled to said impedance; means for controlling the value of said impedance in response to the value of said bias voltage, said means for controlling being coupled to said storage means and to said impedance; a trigger circuit having two states of operation; an amplifier having an input terminal and an output terminal, said input terminal of said amplifier being connected to said impedance, said output terminal of said amplifier being connected to said trigger circuit, said amplifier amplifying said signal voltage from said impedance and delivering an amplified signal to said trigger circuit; and means for controlling the gain of said amplifier in response to said bias voltage, said means for controlling being coupled to said storage means and to said amplifier, said trigger circuit delivering rectangular pulses each having a predetermined time duration in response to said signal voltage.

3. A pulse shaper for use with a source of electrical signal current comprising: a variable impedance the value of which varies in accordance with an applied bias voltage, said impedance being adapted to receive current from said source and to develop a signal voltage in response to said current; a diode; a capacitive storage means, said diode being adapted to receive said signal voltage and to deliver a bias voltage to said storage means, said bias voltage being determined by said signal voltage, said storage means being coupled to said impedance; means for controlling the value of said impedance in response to the value of said bias voltage, said means for controlling being coupled to said storage means and to said impedance; a Schmitt trigger circuit having two states of operation; an amplifier having an input terminal and an output terminal, said input terminal of said amplifier being connected to said impedance, said output terminal of said amplifier being connected to said trigger circuit, said amplifier amplifying said signal voltage from said impedance and delivering an amplified signal to said trigger circuit; and means for controlling the gain of said amplifier in response to said bias voltage, said means for controlling being coupled to the storage means and to said amplifier, said trigger circuit delivering rectangular pulses each having a predetermined time duration in response to said signal voltage.

4. A pulse shaper for use with a source of electrical signal current comprising: first and second signal terminals for receiving a current from said source; first and second variable impedances, the value of each impedance varying in accordance with an applied bias voltage; means for connecting said first impedance between said first and said second terminals, said first impedance being adapted to receive said current and develop a first signal voltage in response to said current; an amplifier having an input terminal and an output terminal, said second impedance being connected as a load for said amplifier whereby the voltage gain of said amplifier varies directly as the value of said second impedance varies, said input terminal being connected to said first signal terminal, said amplifier delivering a second signal voltage to said output terminal, the value of said second signal voltage being determined by said signal current and by the values of said first and said second impedances; an energy storage means, said first and said second impedances being coupled to said storage means, said storage means being coupled to said output terminal, said storage means being adapted to receive said signal voltage and deliver a bias voltage determined by said signal voltage; and a Schmitt trigger circuit, said trigger circuit being connected to said output terminal of said amplifier.

5. A pulse shaper for use with a source of electrical signal current comprising: first and second signal terminals for receiving a current from said source; first and second variable impedances, the value of each impedance varying in accordance with an applied bias voltage; means for connecting said first impedance between said first and said second terminals; an amplifier having an input terminal and an output terminal, said second impedance being connected as a load for said amplifier whereby the voltage gain of said amplifier varies directly as the value of said second impedance varies, said input terminal being connected to said first signal terminal, said amplifier delivering a signal voltage to said output terminal, the value of said signal voltage being determined by said current and by the value of said first and said second impedances; a diode; a capacitive storage means, said diode being coupled to said output terminal, said storage means being coupled to said diode, said diode being adapted to receive said signal voltage and to deliver a bias voltage to said storage means, said bias voltage being determined by said signal voltage, said first and said second impedances being coupled to said storage means; and a trigger circuit having two states of operation, said trigger circuit being connected to said output terminal of said amplifier.

6. A pulse shaper for use with a source of electrical signal current comprising: first and second signal terminals for receiving a current from said source; first and second variable impedances, the value of each impedance varying in accordance with an applied bias voltage; means for connecting said first impedance between said first and said second terminals; first and second amplifiers each having an input terminal and an output terminal, said second impedance being connected as a load for said first amplifier whereby the voltage gain of said first amplifier varies directly as the value of said second impedance varies, said input terminal of said first amplifier being connected to said first signal terminal, said first amplifier delivering a signal voltage to said output terminal of said first amplifier, the value of said signal voltage being determined by said signal current and by the value of said first and said second impedances; an energy storage means, said storage means being coupled to said output terminal of said first amplifier, said storage means being adapted to receive said signal voltage and deliver a bias voltage determined by said signal voltage, said second amplifier being connected between said storage means and said first and said second impedances, said bias voltage being amplified and used to control the values of said first and said second impedances; and a trigger circuit having two states of operation, said trigger circuit being connected to said output terminal of said first amplifier.

7. A pulse shaper for use with a source of electrical signal current comprising: first and second signal terminals for receiving a current from said source; first and second variable impedances, the value of each impedance varying in accordance with an applied bias voltage; means for connecting said first impedance between said first and said second terminals; an amplifier having an input terminal and an output terminal, said second impedance being connected as a load for said amplifier whereby the voltage gain of said amplifier varies directly as the value of said second impedance varies, said input terminal being connected to said first signal terminal, said amplifier delivering a signal voltage to said output terminal, the value of said signal voltage being determined by said signal current and by the value of said first and said second impedances; an energy storage means, said first and said second impedances being coupled to said storage means, said storage means being coupled to said output terminal, said storage means being adapted to receive said signal voltage and deliver a bias voltage determined by said signal voltage, said bias voltage controlling the value of said first and said second impedances; a discharge means, said discharge means being coupled to said storage means; and a trigger circuit having two states of operation, said trigger circuit being connected to said output terminal of said amplifier.

8. A pulse shaper for use with a source of electrical signal current comprising: first and second signal terminals for receiving a current from said source; first and second variable impedances, the value of each impedance varying in accordance with an applied bias voltage; means for connecting said first impedance between said first and said second terminals, first and second amplifiers each having an input terminal and an output terminal, said second impedance being connected as a load for said first amplifier whereby the voltage gain of said first amplifier varies directly as the value of said second impedance varies, said input terminal of said first amplifier being connected to said first signal terminal, said first amplifier delivering a signal voltage to said output terminal of said first amplifier, the value of said signal voltage being determined by said signal current and by the value of said first and said second impedances; a diode; a capacitive storage means, said diode being coupled to said output terminal of said first amplifier, said storage means being coupled to said diode, said diode being adapted to receive said signal voltage and deliver a bias voltage to said storage means, said bias voltage being determined by said signal voltage, said second amplifier being connected between said storage means and said first and said second impedances, said bias voltage being amplified and used to control the values of said first and said second impedances; and a trigger circuit having two states of operation, said trigger circuit being connected to said output terminal of said first amplifier.

9. A pulse shaper for use with a source of electrical signal current comprising: first and second signal terminals for receiving a current from said source; first and second variable impedances, the value of each impedance varying in accordance with an applied bias voltage; means for connecting said first impedance between said first and said second terminals; first and second amplifiers each having an input terminal and an output terminal, said second impedance being connected as a load for said first amplifier whereby the voltage gain of said first amplifier varies directly as the value of said second impedance varies, said input terminal of said first amplifier being connected to said first signal terminal, said first amplifier delivering a signal voltage to said output terminal of said first amplifier, the value of said signal voltage being determined by said signal current and by the value of said first and said second impedances; an energy storage means, said storage means being coupled to said output terminal of said first amplifier, said storage means being adapted to receive said signal voltage and deliver a bias voltage determined by said signal voltage, said second amplifier being connected between said storage means and said first and said second impedances, said bias voltage being amplified and used to control the values of said first and said second impedances; a discharge means, said discharge means being coupled to said storage means; and a trigger circuit having two states of operation, said trigger circuit being connected to said output terminal of said first amplifier.

10. A pulse shaper for use with a source of electrical signal current comprising: first and second signal terminals for receiving a current from said source; first and second variable impedances, the value of each impedance varying in accordance with an applied bias voltage; means for connecting said first impedance between said first and said second terminals; first and second amplifiers each having an input terminal and an output terminal, said second impedance being connected as a load for said first amplifier whereby the voltage gain of said first amplifier varies directly as the value of said second impedance varies, said input terminal of said first amplifier being connected to said first signal terminal, said first amplifier delivering a signal voltage to said output terminal of said first amplifier, the value of said signal voltage being determined by said signal current and by the values of said first and said second impedances; a diode; a capacitive storage means, said diode being coupled to said output terminal of said first amplifier, said storage means being coupled to said diode, said diode being adapted to receive said signal voltage and deliver a bias voltage to said storage means, said bias voltage being determined by said signal voltage, said second amplifier being connected between said storage means and said first and said second impedances, said bias voltage being amplified by said second amplifier and used to control the values of said first and said second impedances; a discharge means, said discharge means being coupled to said storage means; and a trigger circuit having two states of operation, said trigger circuit being connected to said output terminal of said first amplifier.

References Cited

UNITED STATES PATENTS

| | | | |
|---|---|---|---|
| 2,759,047 | 8/1956 | Meacham | 328—164 X |
| 2,794,913 | 6/1957 | Worthen | 328—164 |
| 3,124,706 | 3/1964 | Alexander | 307—88.5 |
| 3,128,395 | 4/1964 | Greiner | 307—88.5 |
| 3,187,199 | 6/1965 | Chur | 307—88.5 |
| 3,204,195 | 8/1965 | Maestre | 331—10 |
| 3,261,986 | 7/1966 | Kawashima et al. | 328—164 X |
| 3,286,035 | 11/1966 | Dias et al. | 307—88.5 X |

ARTHUR GAUSS, *Primary Examiner.*

J. A. JORDAN, *Assistant Examiner.*